United States Patent
Kim et al.

(10) Patent No.: US 7,437,073 B2
(45) Date of Patent: Oct. 14, 2008

(54) SYSTEM FOR PROVIDING DYNAMIC SERVICE USING OPTICAL SUB-CARRIER MULTIPLEXING TYPE MULTI-CHANNEL ACCESS AND METHOD OF CONTROLLING THE SAME

(75) Inventors: Tae Yeon Kim, Daejeon (KR); Hyeon Ho Yoon, Choongchungnam-do (KR); Jeong Ju Yoo, Daejeon (KR); Byoung Whi Kim, Anyang (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 770 days.

(21) Appl. No.: 10/428,955

(22) Filed: May 1, 2003

(65) Prior Publication Data

US 2004/0101302 A1 May 27, 2004

(30) Foreign Application Priority Data

Nov. 26, 2002 (KR) .................. 10-2002-0073734

(51) Int. Cl.
*H04J 14/00* (2006.01)
(52) U.S. Cl. .......................... 398/72; 398/76
(58) Field of Classification Search ............ 398/68–72, 398/76
See application file for complete search history.

(56) References Cited

U.S. PATENT DOCUMENTS 5,978,374 A 11/1999 Ghaibeh et al.
6,023,467 A 2/2000 Abdelhamid et al.
6,317,234 B1 11/2001 Quayle
6,411,410 B1 6/2002 Wright et al.
2001/0030785 A1* 10/2001 Pangrac et al. ............... 359/125
2003/0053476 A1* 3/2003 Sorenson et al. ............ 370/431
2004/0244049 A1* 12/2004 Hahin et al. ................. 725/120

FOREIGN PATENT DOCUMENTS

KR 1999-024196 3/1999
KR 1020010056912 7/2001

OTHER PUBLICATIONS

Electrical add-drop multiplexing for optical communications networks utilizing frequency division multiplexing, 13 pages.
IEEE Communications Magazine, Feb. 2002, pp. 66-73.

* cited by examiner

*Primary Examiner*—Christina Y Leung
(74) *Attorney, Agent, or Firm*—Blakely, Sokoloff, Taylor & Zafman LLP

(57) ABSTRACT

Disclosed herein is a system for providing dynamic service using optical sub-carrier multiplexing type multi-channel access and method of controlling the same. The system includes a plurality of optical sub-carrier multiplexing modems, an optical gigabit-Ethernet switch and a plurality of wavelength division multiplexing couplers. The optical sub-carrier multiplexing modems transmit user traffic using multiple optical sub-carrier channel control. The optical gigabit-Ethernet switch is connected to an access network upstream and to the optical sub-carrier multiplexing modems downstream to manage a plurality of wavelengths and a plurality of optical sub-carrier channels according to the wavelengths. The wavelength division multiplexing couplers connect the plurality of optical sub-carrier multiplexing modems with the optical gigabit-Ethernet switch, perform aggregation and branching of a certain wavelength and transmit it.

8 Claims, 9 Drawing Sheets

FIG. 5A

| Preamble (7) Bytes | SFD (1) Byte | Ftype (1) Bytes | Seq. Id (1) Bytes | Ethernet Frame (1~1500) Bytes | CRC (4) Bytes |
|---|---|---|---|---|---|
| | | (12) | (13) | (14) | |

51 spans Ftype and Seq. Id

Data Frame format

FIG. 5B

| Preamble (7) Bytes | SFD (1) Byte | Ftype (1) Bytes | Mtype (1) Bytes | Control Message | FCS (2) Bytes |
|---|---|---|---|---|---|
| | | (15) | (16) | (17) | |

Control Frame format

FIG. 5C INIT

| System ID (6) Bytes | Capacity ID (1) Byte | Total Capacity (1) Byte |
|---|---|---|
| (18) | (19) | (20) |

FIG. 5D REG

| System ID (6) Bytes | Agg_Grp ID (1) Byte | Capacity (1) Byte | Channel Cnt (1) Byte | Channel Map (3) Bytes |
|---|---|---|---|---|
| | (21) | (22) | (23) | (24) |

FIG. 5E ADD

| Agg_Grp ID (1) Byte | Capacity (1) Byte | Channel Cnt (1) Byte | Channel Map (3) Bytes | Add channel (1) Byte |
|---|---|---|---|---|
| | | | (25) | (26) |

FIG. 5F DROP

| Agg_Grp ID (1) Byte | Capacity (1) Byte | Channel Cnt (1) Byte | Channel Map (3) Bytes | Drop channel (1) Byte |
|---|---|---|---|---|
| | | | | (27) |

FIG. 5G CANC

| System ID (6) Bytes |
|---|
| (28) |

FIG. 5H STATUS

| Agg_Grp ID (1) Byte | Sts_Type (1) Byte | Capacity (1) Byte | Channel Cnt (1) Byte | Channel Map (3) Bytes | Buffer_state (1) Byte |
|---|---|---|---|---|---|
| | (29) | | | | (30) |

SYSTEM FOR PROVIDING DYNAMIC SERVICE USING OPTICAL SUB-CARRIER MULTIPLEXING TYPE MULTI-CHANNEL ACCESS AND METHOD OF CONTROLLING THE SAME

BACKGROUND OF THE INVENTION

1. Field of the Invention

The present invention relates to a system for providing dynamic service using optical sub-carrier multiplexing type multi-channel access and method of controlling the same, which provides desired services to subscribers on an active type optical subscriber access network, and is capable of improving the efficiency of use of optical resources of the network.

2. Description of the Prior Art

For methods for providing data service to subscribers over existing telephone lines, x Digital Subscriber Line (xDSL) technologies have been developed and are currently utilized. Additionally, a scheme of providing data service over a cable network using coaxial cables has been proposed and utilized.

Such existing data service technologies do not seem to be problematic in consideration of the amounts of current Internet traffic that subscribers produce. However, as superhigh speed data services, such as telecommuting, distance video-conferencing, High Definition TeleVision (HDTV) rate moving picture service, distance education and telemedicine, are further popularized in the future, it is expected to become more difficult for the existing data service technologies to provide sufficient, high bandwidth, high quality service because the existing data service technologies have bandwidth and distance limitations.

For subscriber access technology for providing high bandwidth service required by users, there is Passive Optical Network (PON) technology. In a PON, a link ranging from an Optical Line Terminator (OLT) to a passive splitter is shared, and branched to a plurality of Optical Network Units (ONUs) in the range of the passive splitter to subscribers. In particular, the PON technology is suitable for broadcast type services. In this PON technology, as to downstream service, a data broadcasting service is naturally provided based on the characteristics of a passive splitter in downstream service, while, as to upstream service, competition arises on the shared link ranging from the OLT to the passive splitter. The provision for a multiplexing scheme is required to solve the problem.

For such a multiplexing scheme, there has been used Time Division Multiple Access (TDMA) in which a shared link is divided and used along a time axis, which is employed in Asynchronous Transfer Mode (ATM)-PON or Ethernet-PON.

TDMA is known as an effective method by which a plurality of subscribers share a single link. TDMA is disadvantageous in that precise synchronization is required to implement TDMA, and the access of subscribers is influenced by the states and requests of other subscribers. Additionally, an increase in overhead due to periodical polling and ranging becomes a burden.

In particular, with the development of Dense Wavelength Division Multiple Access (DWDMA) technology that divides optical resources into sub-resources according to multiple wavelengths, technology for effectively using optical resources is required. For example, Wavelength Division Multiplexing (WDM)-PON has a multichannel support architecture that connects an OLT to an Arrayed Wavelength Guide (AWG) and branches optical resources into sub-resources according to wavelengths between the AWG and the ONU. This architecture is advantageous in terms of the total efficiency of a network. However, the branching is performed according to wavelengths between the ONU and the OLT, so it is meaningless to carry out control according to wavelengths at the OLT. As a result, different multiplexing schemes are employed according to wavelengths.

The Institute of Electrical and Electronics Engineers (IEEE), the International Telecommunications Union (ITU) and the Full Service Access Network (FSAN) have pursued schemes of providing services over an optical fiber-based optical subscriber network, and have proposed Very high bit rate Digital Subscriber Line (VDSL) and the PON. However, in order to implement such service schemes, optical subscriber technology, in which DWDM is directly applied to subscriber equipment, is required. Accordingly, new technology for optical subscriber equipment and optical distribution networks, and a scheme of utilizing optical resources further actively are required.

SUMMARY OF THE INVENTION

Accordingly, the present invention has been made keeping in mind the above problems occurring in the prior art, and an object of the present invention is to provide a system for providing dynamic service using optical sub-carrier multiplexing type multi-channel access and method of controlling the same, which provides desired services to subscribers on an active type optical subscriber access network, and is capable of improving the efficiency of use of optic al resources of the network.

In order to accomplish the above object, the present invention provides a system for providing dynamic service using optical sub-carrier multiplexing type multi-channel access, including a plurality of optical sub-carrier multiplexing modems for transmitting user traffic using multiple optical sub-carrier channel control; an optical gigabit-Ethernet switch connected to an access network upstream and to the optical sub-carrier multiplexing modems downstream to manage a plurality of wavelengths and a plurality of optical sub-carrier channels according to the wavelengths; and a plurality of wavelength division multiplexing couplers for connecting the plurality of optical sub-carrier multiplexing modems with the optical gigabit-Ethernet switch, performing aggregation and branching of a certain wavelength and transmitting it.

Preferably, each of the optical sub-carrier multiplexing modems may include an Emulation Media access control Sub-layer (EMS) for providing a standard interface to subscribers; a Channel Aggregation Control (CAC) unit and a Channel Aggregation Control Protocol (CACP) unit for performing initialization of the optical sub-carrier multiplexing modem and dynamic bandwidth allocation; an aggregator for transmitting data according to bandwidth allocation of the CAC unit; a control parser/mux unit for performing aggregation and branching of channels using channel information provided by the aggregator; and a transmission unit for configuring data or control data generated in the CAC unit or aggregator into a frame and transmitting the frame to the optical gigabit-Ethernet switch.

Preferably, the optical gigabit-Ethernet switch may include a switch unit connected to the access network for performing switching function between access nodes having different wavelengths within the same subnet and with an external access main network; an EMS for providing a standard interface to subscribers; a CAC unit and a CACP unit for performing dynamic bandwidth allocation for multi-wavelength multiple sub-carrier channels; an aggregator for accessing the multi-wavelength multiple sub-carrier channels and distributing/aggregating data according to bandwidth allocation of the CAC unit; a control parser/mux unit for performing aggregation and branching of multi-wavelength multiple sub-carrier channels using channel information provided by the aggregator; and a transmission unit for configuring data or control data generated in the CAC unit or aggregator into a frame and transmitting the frame to the optical gigabit-Ethernet switch.

In addition, the present invention provides a control method for performing the establishment, cancellation of the establishment and expansion of a channel in the system for providing dynamic service using optical sub-carrier multiplexing type multi-channel access.

BRIEF DESCRIPTION OF THE DRAWINGS

The above and other objects, features and advantages of the present invention will be more clearly understood from the following detailed description taken in conjunction with the accompanying drawings, in which:

FIGS. 5A to 5H are various frame formats defined in the present invention;

DESCRIPTION OF THE PREFERRED EMBODIMENTS

Figure 1:
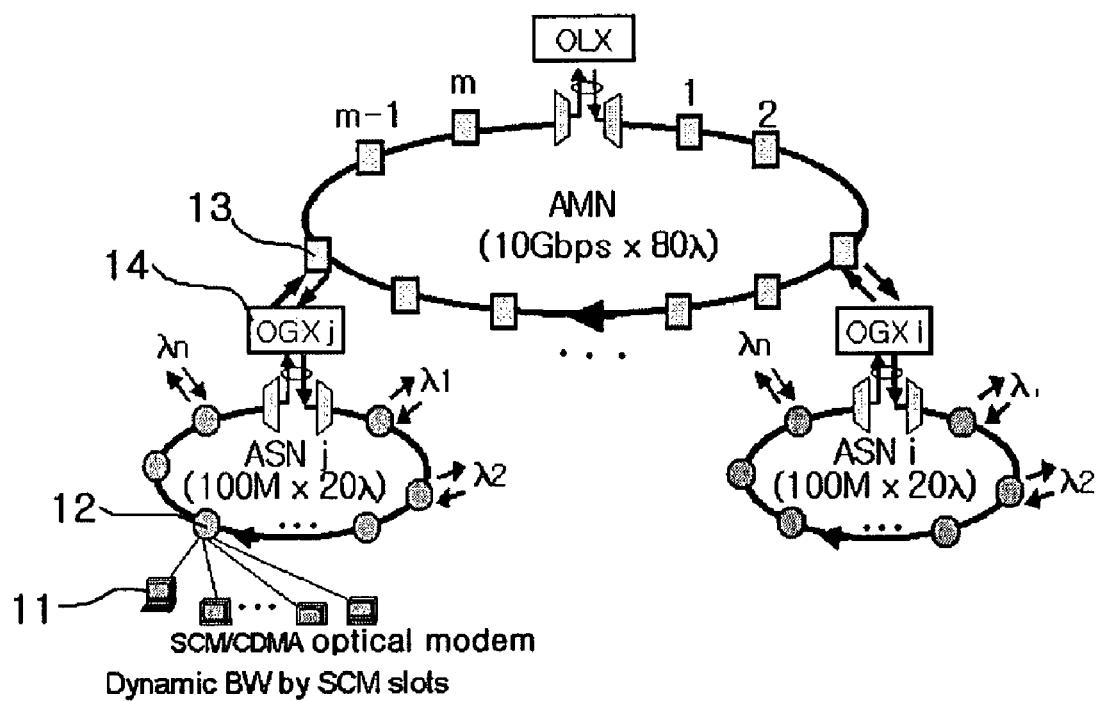
FIG. 1 is a schematic diagram showing the entire construction of an active type optical subscriber access network to which the present invention is applied.

Reference now should be made to the drawings, in which the same reference numerals are used throughout the different drawings to designate the same or similar components.

FIG. 1 is a schematic diagram showing the entire construction of an active type optical subscriber access network to which the present invention is applied. The active type optical subscriber access network includes a plurality of access subnets ASNs in each of which a plurality of access nodes 12, each of which branches a signal into set wavelength signals for a plurality of optical subscriber modems 11 divided according to wavelengths, are connected to each other, and an access main network AMN in which a plurality of connection nodes, to each of which each of the access subnets ASNs is connected, are connected to each other.

An Optical-Gigabit-Ethernet Switch (OGX) 14 is connected to each of the connection nodes 13, and each of the access nodes 12 of the access subnet ASN is connected to the OGX 14.

The present invention aims to directly apply Wavelength Division Multiplexing (WDM) to the above-described access network. In the present invention, the OGX 14 supports a plurality of wavelengths and sub-carrier access according to wavelengths, and is connected to a passive type wavelength Add/Drop multiplexer for branching resources into sub-resources according to wavelengths in a ring form, so the branched sub-resources are optical sub-carrier multiplexed and distributed to subscribers.

That is, in accordance with the present invention, a subscriber group is created according to a wavelength and service is provided to each subscriber according to a sub-carrier channel. There is enabled active connection between the optical gigabit-Ethernet switch, at which the distribution of a subscriber network starts, and subscriber terminals.

Figure 2:
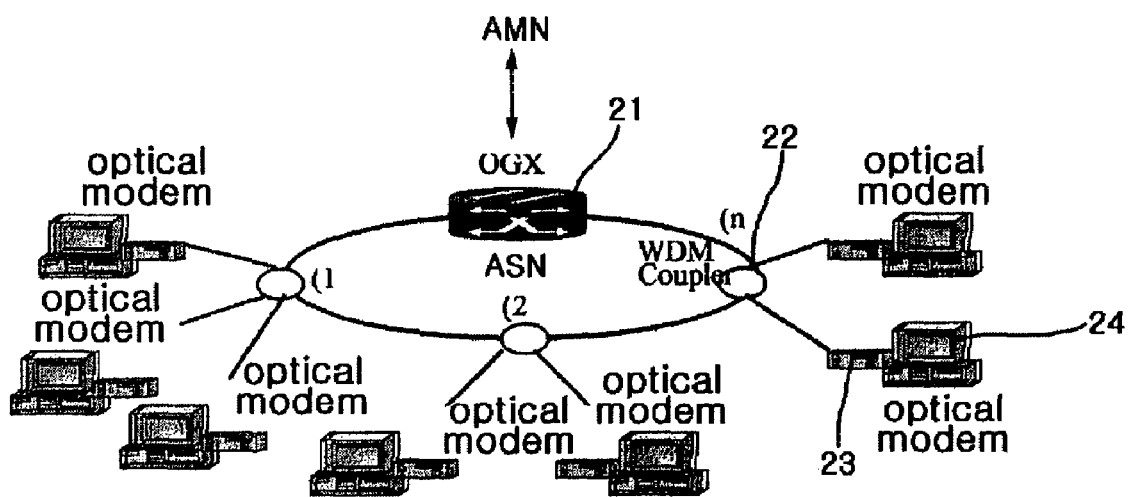
FIG. 2 is a diagram showing an access subnet of the active type optical subscriber access network.

FIG. 2 is a diagram showing an access subnet of the active type optical subscriber access network. A plurality of access nodes 22 are connected to an optical-Gigabit-Ethernet switch (hereinafter referred to as an "Ethernet switch") 21. A plurality of optical sub-carrier multiplexing modems (hereinafter referred to as "optical modems") 23 are connected to each of the access nodes 22. A subscriber terminal 24 is connected to each of the optical modems 23. Each of the access nodes 22 is a WDM coupler that branches resources according to wavelengths. The access nodes 22 are set to different wavelengths.

In that case, the access node 22 and the subscriber terminal 24 are connected to each other via the optical modem 23 that multiplexes a certain wavelength added and dropped based on wavelength add/drop multiplexing into an optical sub-carrier channel.

Accordingly, the access subnet ASN of a ring topology shown in FIG. 2 actually has a star type logical topology like a virtual dedicated line via an optical sub-carrier channel. As a result, on an access subnet, a wavelength can be processed with a single link that virtually has one or more channels.

For example, a single optical sub-carrier channel may be allotted to one subscriber as a virtual link, while two or more optical sub-carrier channels may be allotted to another subscriber as a virtual link.

Figure 3:
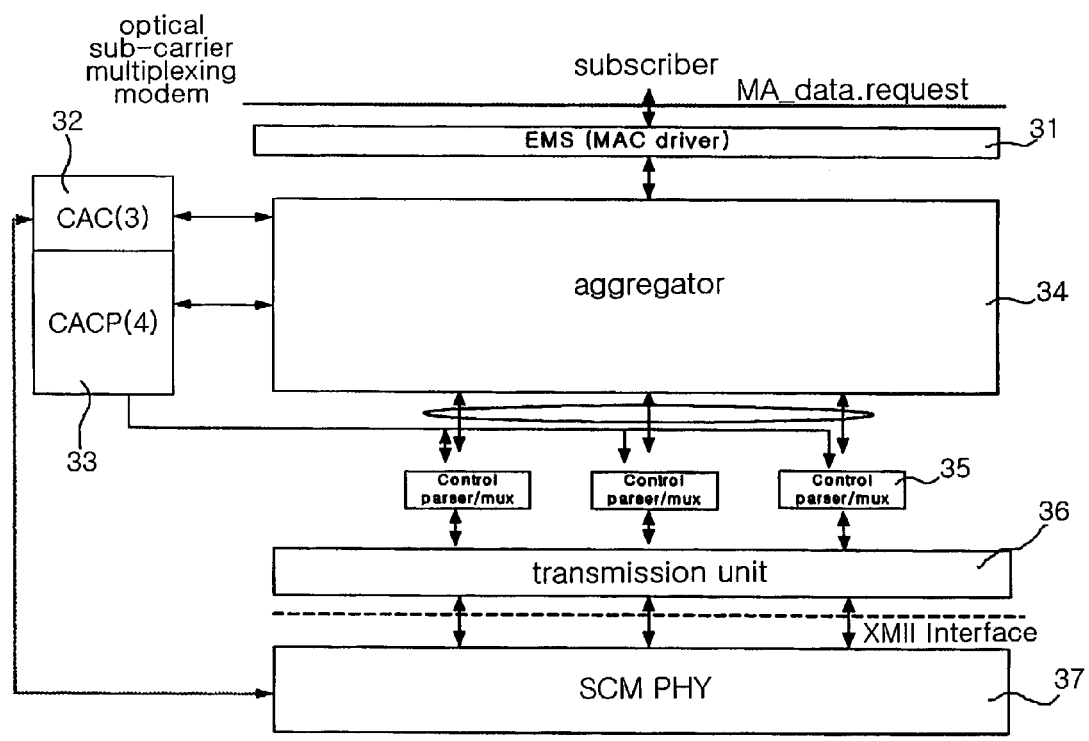
FIG. 3 is a block diagram of an optical sub-carrier multiplexing modem according to the present invention.

FIG. 3 is a block diagram showing the construction of the optical modem 23 with which the subscriber terminal 24 is equipped on the access network constructed as described above. The optical modem 23 includes an Emulation Media access control Sub-layer (EMS) 31 for providing a standard interface to subscribers, a Channel Aggregation Control (CAC) unit 32 and a Channel Aggregation Control Protocol (CACP) unit 33 for performing initialization of the optical sub-carrier multiplexing modem and dynamic bandwidth allocation, an aggregator 34 for transmitting data according to the bandwidth allocation of the CAC unit 32, a control parser/mux unit 35 for performing the aggregation and branching of channels using channel information provided by the aggregator 34, and a transmission unit 36 for configuring data or control data generated in the CAC unit 32 or aggregator 34 into a frame and transmitting the frame to a transport layer connected to the OGX 21.

Figure 4:
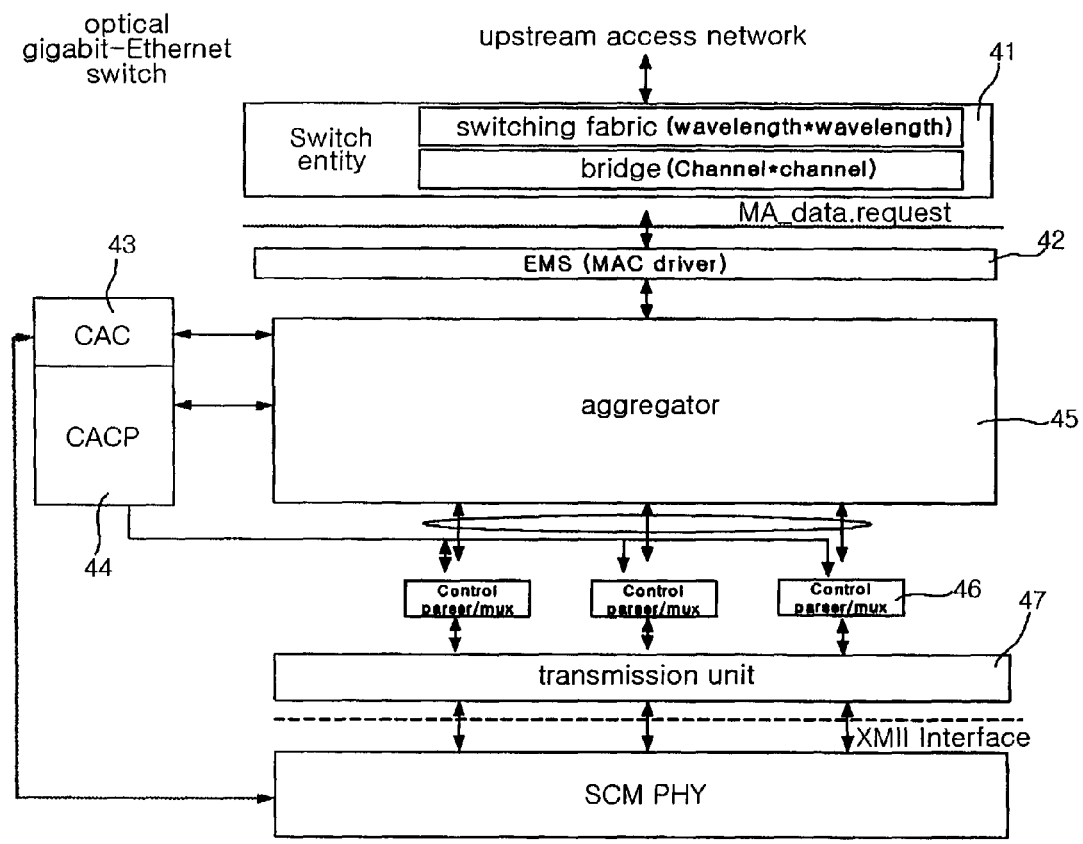
FIG. 4 is a block diagram of an optical gigabit-Ethernet switch according to the present invention.

FIG. 4 is a block diagram showing the Ethernet switch 21 that is part of the access network of the present invention. The Ethernet switch 21 supports multiple wavelengths, and is connected to the access network upstream thereof and to the optical modem 23 downstream thereof.

The Ethernet switch 21 includes a switch unit 41 connected to the access network for performing switching function between access nodes having different wavelengths within the same subnet, an EMS 42, a CAC 43, a CACP 44, a data aggregator 45, a control parser/mux 46, and a transmitter 47.

Of the above elements of the Ethernet switch 21, the EMS 42, the CAC 43, the CACP 44, the data aggregator 45, the control parser/mux 46 and the transmitter 47 perform functions similar to those of the optical modem 23. The CAC 43, the CACP 44 and the data aggregator 45 of the Ethernet switch 21 are merely different from those of the optical modem 23 in that the CAC 43, the CACP 44 and the data aggregator 45 access multiple sub-carrier channels of multiple wavelengths rather than a single link.

Formats of data and control frames, which are transmitted between the optical modem 23 and the Ethernet switch 21 constructed as described above, are illustrated in FIGS. 5A and 5B.

FIG. 5A shows the format of the data frame, and FIG. 5B shows the format of the control frame. The data and control frames are each formed by adding a two-byte header 51 to an Ethernet frame including a Preamble field, a Start Frame Delimiter (SFD) field, a Data or Control Message field and a Cyclic Redundancy Code (CRC) field. Of the fields of the added header 5, an Ftype field is the field used to distinguish the types of frames from each other at the control parser/mux units 35 and 46 of the Ethernet switch 21 and the optical modem 23. For example, a frame having an Ftype field value of 0x0000 is defined as a data frame while a frame having an Ftype field value of 0x0001 is defined as a control frame.

As illustrated in FIG. 5A, the data frame includes a Sequence IDentification (ID) (Seq. id) field that indicates the sequence number of this data frame in a single stream. In this case, the single stream is a unit in which the sequence of frames should be maintained, and is based on the address of the optical modem 23 that transmits the frames. The aggregators 34 and 45 of the Ethernet switch 21 and the optical modem 23 reassemble the frames according to the sequence information of sequence ID fields. Additionally, the data field in the data frame indicates the data information of a user.

In contrast, the format of the control frame is defined differently from the format of the data frame. As illustrated in FIG. 5B, the Ftype field is a field that indicates the type of a frame, that is, a data frame or a control frame. For example, when the Ftype field has a value of 0x0001, the frame may be defined as a control frame. The next field of the format of the control frame is an Mtype field that indicates the type of a control frame. The Control Message field is the field that indicates a set of parameters according to the type of a control frame and is defined differently according to the type of a control frame.

FIG. 5C shows the format of the Control Message field when the control message is an initialization request (INIT) message. The INIT message is the message that requests initialization from the optical modem 23 after the optical modem 23 starts. In this case, the control message field includes a System ID field, a Capacity ID field and a Total Capacity field. In this case, the System ID field indicates the unique identifier of the optical modem 23, and is used to identify the optical modem 23 at the Ethernet switch 21 at the time of initialization. Next, the Capacity Id indicates the capacity of each channel of the optical modem 23, and is defined in Mbps. Finally, the Total Capacity field indicates the total capacity of the optical modem 23, and can be obtained using the following Equation 1.

Number of channels of optical modem=Total Capacity/Capacity Id (1)

FIG. 5D indicates the format of the Control Message field when the control message is a REG message. The REG message is the message with which the Ethernet switch 21 responds to the initialization request of the optical modem 23.

In this case, the Control Message field includes a System Id field used to ascertain the contents of the INIT message, an Agg_Grp_Id field that reports that optical sub-carrier channels requesting initialization via the INIT messages are recognized as a single group at the Ethernet switch 21 and is used to distinguish optical modems 23 from each other afterward, a Capacity field indicates a total capacity allocated to the Ethernet switch 21 in response to the request of the optical modem 23, and Channel Cnt and Channel Map fields indicate the number of actually allocated ones of channels requested by the optical modem 23 and the numbers of channels, respectively.

For control messages, a message relating to dynamic bandwidth allocation is required. FIG. 5E shows the format of the Control Message field when the control message is an ADD message relating to the dynamic bandwidth allocation. The ADD message is the message that is employed when the Ethernet switch 21 notifies the optical modem 23 of the information of channels added to expand a bandwidth, and is used as a response to the request of the optical modem 23. In the case of the ADD message, the Control Message field includes the Agg_Grp_ID field, the Capacity field and the Channel Cnt field included in the Control Message field of the REG message, a Channel Map field indicates the status of channels not allocated yet, and an Add Channel field indicates the numbers of channels additionally allocated.

Furthermore, a DROP message is the message via which the Ethernet switch 21 notifies the optical modem 23 of the information of one or more channels deleted to curtail the bandwidth, and may be used as a response to the request of the optical modem 23. As illustrated in FIG. 5F, the format of the DROP message is basically similar to that of the ADD message, but includes a Drop channel field indicating one or more channels desired to be deleted, instead of the ADD channel field.

A CANC message is the control message that is employed when the Ethernet switch 21 or optical switch 23 requests the cancellation of initialization in an initialization stage for any reason, or when service is stopped in an operation stage. The CANC message is controlled via a System Id of the optical modem 23.

A STATUS message can be used for various purposes. For example, the STATUS message is used as a final confirmation response of the optical modem 23 regarding the registration of the Ethernet switch 21 in the initialization stage, as the message via which the optical modem 23 requests the extension or reduction of a bandwidth from the Ethernet switch 21 in an operation stage when a demand for the extension or reduction of the bandwidth occurs at the optical modem 23, and as the message that cancels the alternation of a bandwidth in a dynamic bandwidth allocation stage. As illustrated in FIG. 5H, the format of the STATUS message is different from that of the REG message in that the format of the STATUS message excludes the System ID field therefrom and includes an Sts_type field and a Buffer_state field therein. In the format of the STATUS message, the Sts_Type field is the field that distinguishes the purpose of a message from other purposes, and may be defined as shown in table 1.

TABLE 1

| CODE | USE |
| --- | --- |
| 0x0000 | normal |
| 0x0001 | add |
| 0x0002 | drop |
| 0x0003 | quit |
| 0x0004~0xffff | reserved |

The Buffer_state field is used to indicate the current states of the buffers of the optical modem 23. The Buffer_state indicates the current states of a transmission buffer and a reception buffer using four bits for each buffer. Each of the buffer states is represented as the ratio of the total size of a buffer to the current standby size of the buffer, which ranges from 0 state to 16 states.

An optical modem initialization process and a dynamic bandwidth allocation process are performed by carrying out operations according to a channel aggregation control protocol through the use of control messages defined as described above, which are described below with reference to the flowcharts of FIGS. 6 to 7.

Figure 6:
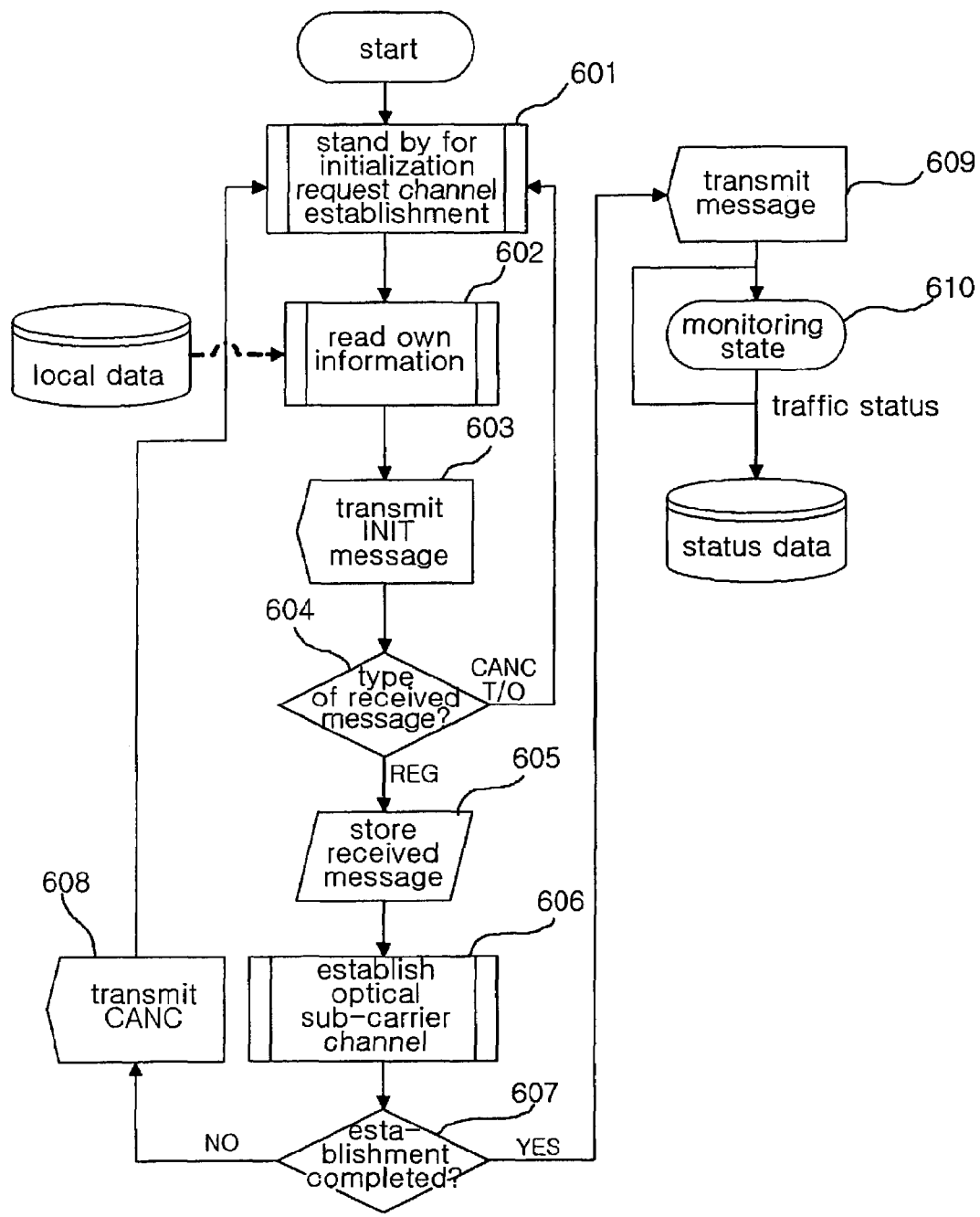
FIG. 6 is a flowchart showing an initialization process at the optical sub-carrier multiplexing modem according to the present invention.

FIG. 6 is a flowchart showing an initialization process at the optical modem 23. When the optical modem 23 is started, the optical modem 23 stands by for the establishment of an initialization request channel allocated thereto in advance, at step 601. Until the initialization request channel is ready, the optical modem 23 reads a system ID, a unit capacity and a total capacity at step 602, and generates an initialization request (INIT) message and transmits it to the Ethernet switch 21 at step 603. Thereafter, the optical modem 23 stands by for a response from the Ethernet switch 603.

If the response has not been transmitted from the Ethernet switch 603 for a predetermined response time or a CANC message has been transmitted as the response, the optical modem 21 stops the initialization process being currently performed, and returns to the initial step 601 of the optical modem initialization process, at step 604.

In contrast, if the optical modem 23 has received a REG message from the Ethernet switch 603, the optical modem 23 determines that a response has been transmitted from the Ethernet switch 603, and stores the received message (REG message) in the data thereof at step 605. Additionally, the optical modem 23 establishes an optical sub-carrier channel according to the contents of the stored REG message (the number of channels and channel Numbers allocated) at step 606.

If an error occurs during the establishment of the optical sub-carrier channel, the optical modem 23 transmits to the Ethernet switch 21 a CANC message indicating the cancellation of channel establishment, and returns the initial step 601 of the optical modem initialization process at steps 607 and 608.

In contrast, if the establishment of the optical sub-carrier channel has been successfully completed at step 607, the optical modem 23 transmits a STATUS-norm message to the Ethernet switch 21 at step 609, and monitors the optical sub-carrier channel established between the Ethernet switch 21 and itself and records statistical information about the established optical sub-carrier channel at step 610.

Figure 7:
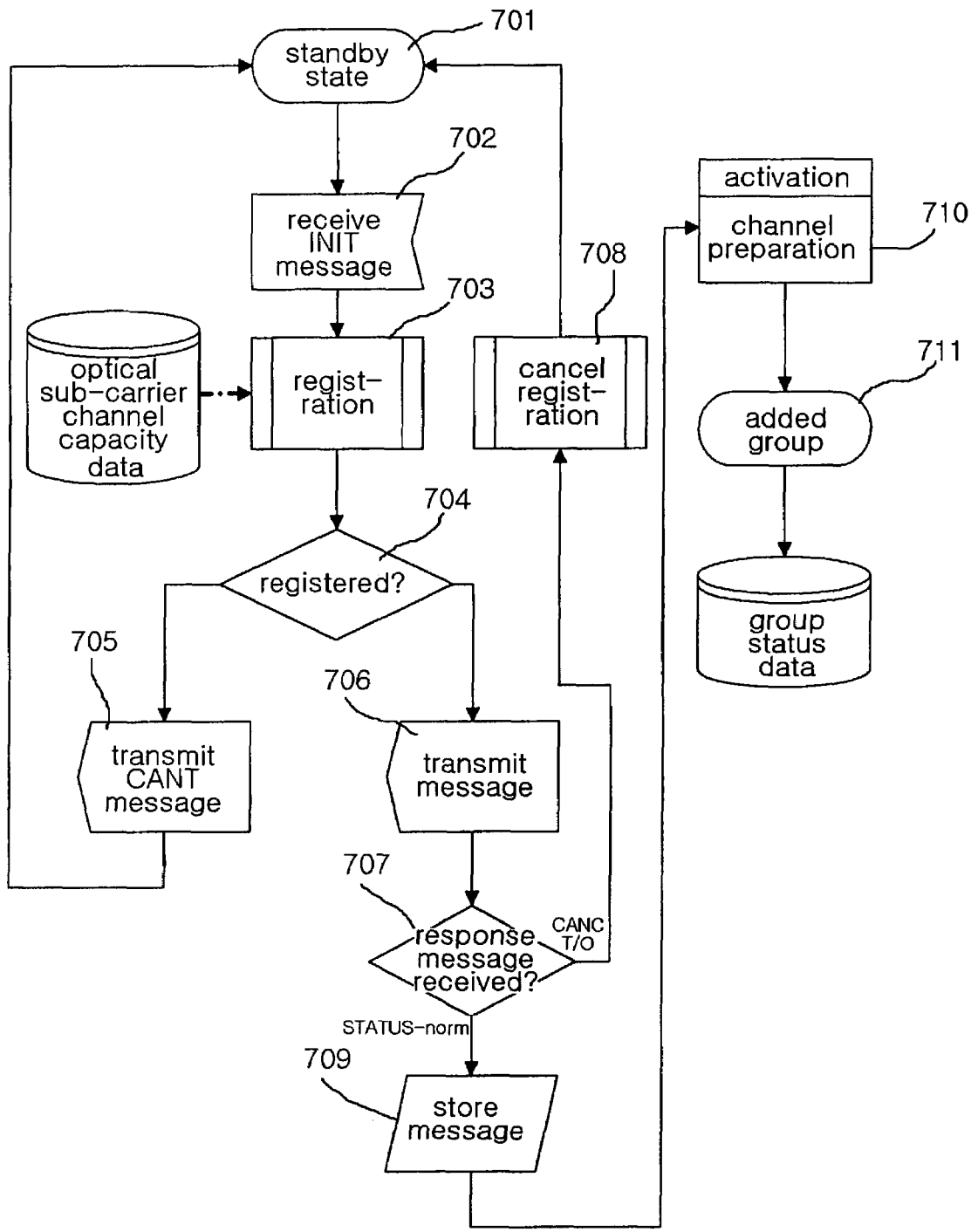
FIG. 7 is a flowchart showing a process of registering the optical sub-carrier multiplexing modem at the optical gigabit-Ethernet switch according to the present invention.

FIG. 7 is a flowchart showing the Ethernet switch initialization process.

As illustrated in FIG. 7, the Ethernet switch 21 stands by at step 701, and starts an initialization process when it receives an INIT message at step 702.

When the Ethernet switch 21 receives the INIT message from the optical modem 21, the Ethernet switch 21 processes a new registration with reference to the capacity data of an optical sub-carrier channel managed thereby in response to a request included in the received message at step 703. If the request from the optical modem 21 cannot be fulfilled due to a shortage of capacity or the like at step 704, the Ethernet switch 21 transmits a CANC message to the optical modem 23 and stands by for another initialization request at steps 704 and 701.

In contrast, if the registration has been successfully completed at step 704, the Ethernet switch 21 transmits a REG message to the optical modem 23, and stands by for a response at step 706.

In this case, if the response has not been transmitted from the Ethernet switch 603 for a predetermined response time or a CANC message has been received at step 707, the Ethernet switch 603 cancels the registration and returns to the standby state of step 701 where the Ethernet switch 603 stands by for an initialization request from an optical modem, at step 708.

In contrast, if a STATUS-norm message is received from the optical modem 23, the Ethernet switch 21 stores the received message at steps 707 and 709, and an active state process is created at step 710. Thereafter, the Ethernet switch 21 records the information of a created group in group information and collects and monitors statistical information at step 711.

Through the above-described process, the multi-channel process is performed to dynamically allocate channels according to the state of a channel at the state in which the optical modem 23 is activated.

Figure 8:
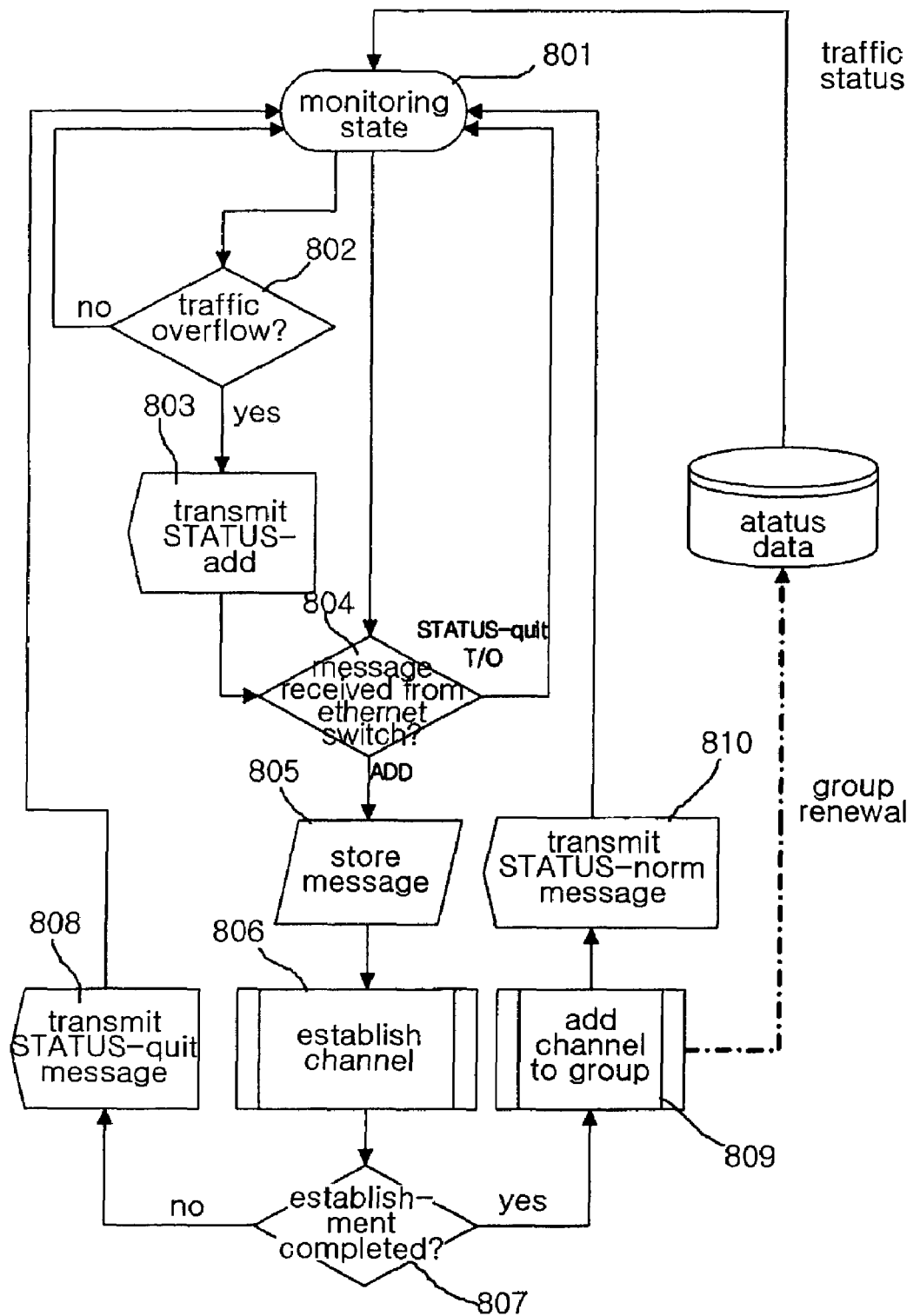
FIG. 8 is a flowchart showing a dynamic bandwidth allocation process at the optical sub-carrier multiplexing modem according to the present invention.

FIG. 8 is a flowchart showing a dynamic bandwidth allocation process at the optical sub-carrier multiplexing modem according to the present invention. While the optical modem 23 monitors the traffic state thereof at step 801, a monitoring operation continues if the amount of traffic does not exceed a critical value at step 802. In contrast, if the amount of traffic exceeds the critical value and reaches an overflow state, the optical modem 23 transmits a STATUS-add message requesting the addition of a channel to the Ethernet switch 21 and stands by for a response at step 803.

Additionally, an arbitrary request may be presented by the Ethernet switch 21 regardless of the state of the optical modem 23.

Meanwhile, if a STATUS-quit message indicating the impossibility of the addition of a channel is received from the Ethernet switch 21 or a predetermined response time has been elapsed, the optical modem 23 returns to the monitoring state of step 801 at step 804.

In contrast, if an ADD message is received as a response to the transmitted STATUS-add message or arbitrarily transmitted from the Ethernet switch 21 at step 804, the optical modem 23 stores the received message at step 805 and channel establishment is started at step 806. If an error occurs in the process of the channel establishment at step 807, the optical modem 23 transmits to the Ethernet switch 21 the STATUS-quit message indicating the cancellation of the channel establishment, and returns to the monitoring state of step 801 at step 808. If the channel establishment has been completed at step 807, the optical modem 23 adds a newly establishment channel to a group stored in its state data at step 809. If the group information of the state data is updated by the above-described process, the number of channels to be monitored is increased and the traffic of the group including the newly added channel is monitored.

Thereafter, the optical modem 23 transmits to the Ethernet switch 21 a STATUS-norm message indicating the normal completion of the channel establishment at step 810. Subsequently, the optical modem 23 returns to the monitoring state of step 801 to monitor the group including the newly added channel, and monitors the traffic statistics and state data thereof.

Figure 9:
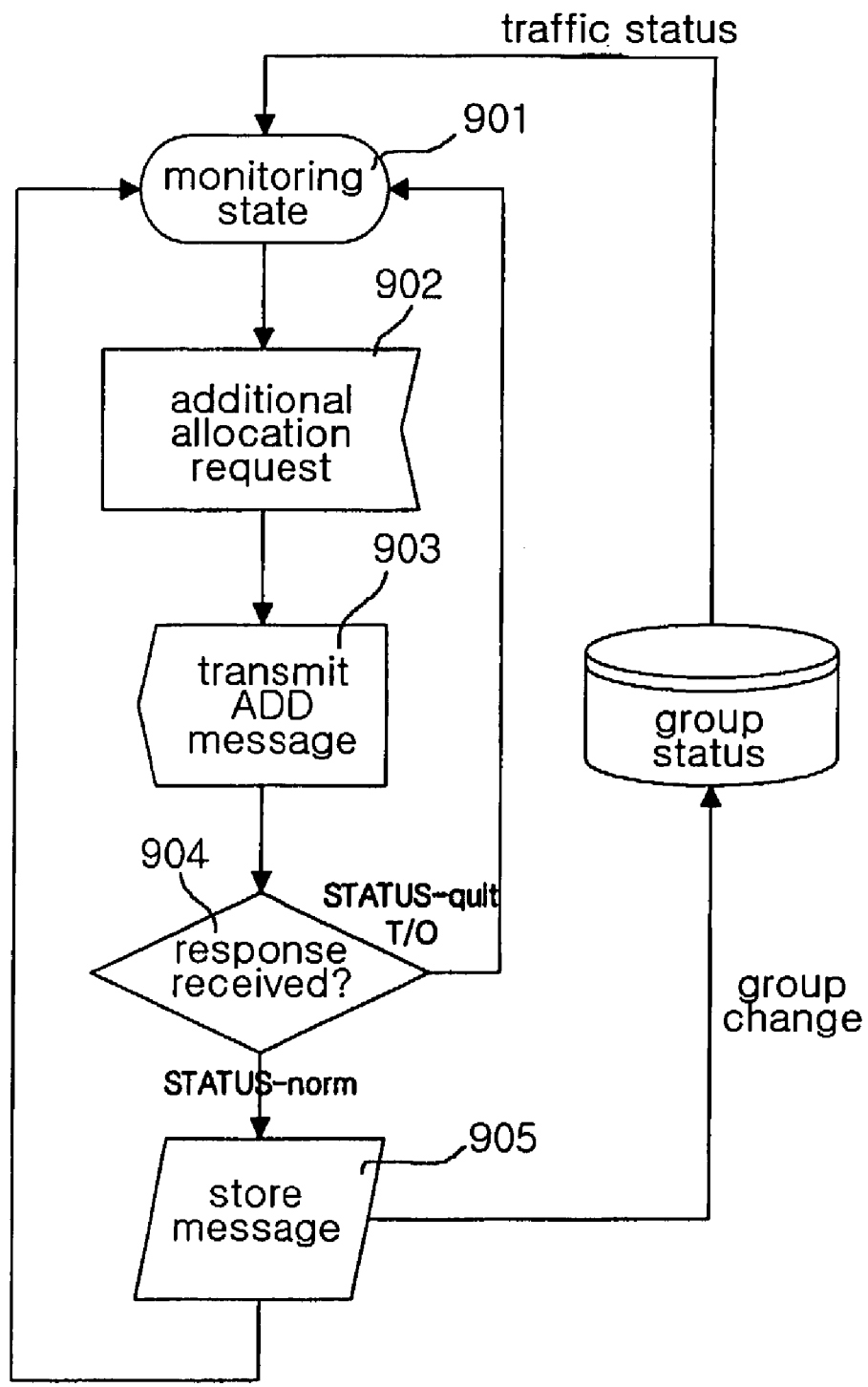
FIG. 9 is a flowchart showing a dynamic bandwidth allocation process at the optical gigabit-Ethernet switch according to the present invention.

FIG. 9 is a flowchart showing a dynamic bandwidth allocation process performed by the Ethernet switch in response to the request of an operator.

As illustrated in the drawing, if a request for additional allocation is presented by an operator at the monitoring state of step 901 at step 902, the Ethernet switch 21 transmits an ADD message to the optical modem 23 and stands by for a response at step 903.

If the response has not been transmitted from the Ethernet switch 603 for a predetermined response time or a STATUS-quit message has been received during the standby for the response, the Ethernet switch 603 cancels the additional allocation of the channel and returns to the monitoring state of step 901 at step 904.

If a STATUS-norm message indicating the completion of the channel establishment is received from the optical modem 23 and a bandwidth has been successfully added, the Ethernet switch 21 stores related information and returns to the monitoring state of step 901 at step 905.

As described above, the present invention provides a system for providing dynamic service using optical sub-carrier multiplexing type multi-channel access and method of controlling the same, which is advantageous in terms of an optical subscriber access network, as follows:

First, when a single optical fiber is divided into several tens of wavelength sections, the efficiency of use of optical resources can be maximized by employing Dense Wavelength Division Multiplexing technology. Second, the expandability of a subscriber network is provided, so the subscriber network can smoothly increase with the development of the DWDM technology. Third, the connection of subscribers having different wavelengths and different sub-carrier channel groups at the same wavelength is enabled, so the RAN construction of the subscribers is enabled. Fourth, operation is performed in sub-carrier channels on an access net, so the construction of the logical configuration of a flexible network is enabled.

In addition, when compared to existing TDMA technology, the system and method of the present invention is advantageous as follows:

First, a unique channel is used, and therefore influence from other subscribers is minimized, thereby obtaining the same effects as an exclusive line. Second, a locally independent link is used, so complicated scheduling is not required. Third, distance measurement is not required, and the burst mode transmission/reception technique of precise time units is not required due to the natural utilization of another link. Fourth, the expansion and curtailment of each sub-carrier channel is enabled, so the granularity of operation is increased. Fifth, even though a certain sub-carrier channel undergoes anomaly due to various causes, a useful sub-carrier channel within the same wavelength is logically created, thus allowing a link protection function to be easily added.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for providing dynamic service using optical sub-carrier multiplexing type multi-channel access, comprising:

a plurality of optical sub-carrier multiplexing modems each allocated with an optical sub-carrier channel which changes dynamically to transmit user traffic through the optical sub-carrier channel and comprising a Channel Aggregation Control (CAC) unit and a Channel Aggregation Control Protocol (CACP) unit for performing initialization of the optical sub-carrier multiplexing modems and dynamic bandwidth allocation;

an optical gigabit-Ethernet switch connected to an access network upstream and to the optical sub-carrier multiplexing modems downstream to monitor traffic states of the optical sub-carrier channel according to a plurality of wavelengths and a plurality of optical sub-carrier channels in order to allocate an optical sub-carrier channel dynamically; and a plurality of wavelength division multiplexing couplers for connecting the plurality of optical sub-carrier multiplexing modems with the optical gigabit-Ethernet switch, performing aggregation and branching of a certain wavelength and transmitting it.

2. The system as set forth in claim 1, wherein each of the optical sub-carrier multiplexing modems comprises:

an Emulation Media access control Sub-layer (EMS) for providing a standard interface to subscribers;

an aggregator for transmitting data according to bandwidth allocation of the CAC unit;

a control parser/mux unit for performing aggregation and branching of channels using channel information provided by the aggregator; and a transmission unit for configuring data or control data generated in the CAC unit or aggregator into a frame and transmitting the frame to the optical gigabit-Ethernet switch.

3. The system as set forth in claim 2, wherein each of the control and data frames transmitted between the optical sub-carrier multiplexing modems and the optical gigabit-Ethernet switch comprises:

seven-byte preamble field;

one-byte Start Frame Delimiter (SFD) field;

two-byte frame distinguishing field for distinguishing the control and data frames from each other;

a Data or Control Message field; and a Cyclic Redundancy Code (CRC) field for checking a transmission error.

4. The system as set forth in claim 3, wherein the frame distinguishing field comprises:

one byte for indicating the data frame, and a one-byte sequence IDentification (ID) for representing an order of the data frame in a corresponding data stream, in the case of the data frame; and one byte for indicating the control frame, and one byte for indicating a type of the control frame, in the ease of the control frame.

5. The system as set forth in claim 3, wherein the control frame comprises:

a system ID field for identifying a corresponding optical modem, a capacity ID field, and a total capacity field, in the case of an initialization request message;

a system ID field for identifying a corresponding optical modem, a group ID field for indicating a group ID field for indicating that optical sub-carrier channels required to be initialized through the initialization request message are recognized as a group, a channel capacity field, a total capacity field for indicating a total capacity actually allocated in response to a request of the optical field, and a channel map field for indicating a number of channels and channel numbers actually allocated, in the case of a channel registration message;

a group ID field for indicating a group of requested optical sub-carrier channels, a channel capacity field, a channel capacity field, a channel map field for indicating a number of channels and channel numbers not allocated yet, and a channel number field for indicating a channel number to be added or deleted, in the case of a bandwidth expansion or curtailment message;

a system ID field for identifying an optical modem for which cancellation is performed, in the case of the cancellation message; and a group ID field for indicating a group ID of registered optical sub-carrier channels, a status type field for indicating a purpose of a message, a channel capacity field, a total capacity field for indicating a total capacity actually allocated in response to a request of the optical field, a channel map field for indicating a number of channels and channel numbers actually allocated, and a buffer state field for indicating a state of a buffer, in the case of a state message.

6. The system as set forth in claim 1, wherein the optical gigabit-Ethernet switch comprises:

a switch unit connected to the access network for performing switching function between access nodes having different wavelengths within the same subnet and with an external access main network;

an EMS for providing a standard interface to subscribers;

a CAC unit and a CACP unit separate from the CAC unit and the CACP unit of the plurality of optical sub-carrier multiplexing modems for performing dynamic bandwidth allocation for multi-wavelength multiple sub carrier channels;

an aggregator for accessing the multi-wavelength multiple sub-carrier channels and distributing/aggregating data according to bandwidth allocation of the CAC unit of the optical gigabit-Ethernet switch;

a control parser/mux unit for performing aggregation and branching of multi-wavelength multiple sub-carrier channels using channel information provided by the aggregator; and a transmission unit for configuring data or control data generated in the CAC unit of the optical gigabit-Ethernet switch or aggregator into a frame and transmitting the frame to the optical gigabit-Ethernet switch.

7. A method of controlling a system for providing dynamic service using optical sub-carrier multiplexing type multi-channel access, comprising the steps of:

an optical sub-carrier multiplexing modem establishing an initialization channel and requesting initialization from an optical gigabit-Ethernet switch;

the optical gigabit-Ethernet switch having received the initialization request allocating an available optical sub-carrier channel, registering the allocated optical sub-carrier channel as a group, and informing the optical gigabit-Ethernet switch of the registering of the channel;

the optical sub-carrier multiplexing modem establishing its own channel in conformity to the registered information, and informing the optical gigabit-Ethernet switch of the establishing of the channel of the optical sub-carrier multiplexing modem; and the optical sub-carrier multiplexing modem and optical gigabit-Ethernet switch statistically monitoring traffic states of the established channels, respectively, after the establishing of the channels are completed.

8. The method as set forth in claim 7, further comprising the steps of:

the optical sub-carrier multiplexing modem requesting expansion or curtailment of a bandwidth according the traffic states of the established channels;

searching for an available channel, or selecting a channel to be deleted in response to the requesting of expansion and curtailment;

the optical gigabit-Ethernet switch requesting addition or deletion of the searched or selected channel from the optical sub-carrier multiplexing modem; and the optical sub-carrier multiplexing modem establishing or canceling the searched or selected channel, and transmits a result of the establishing or canceling to the optical gigabit-Ethernet switch.

* * * * *